United States Patent
Leyendecker

(10) Patent No.: US 7,079,752 B1
(45) Date of Patent: Jul. 18, 2006

(54) PROCESS FOR RECORDING A SCRAMBLED MPEG STREAM

(75) Inventor: Philippe Leyendecker, Chateaugiron (FR)

(73) Assignee: Thomson Licensing, Boulogne-Billancourt (FR)

( * ) Notice: Subject to any disclaimer, the term of this patent is extended or adjusted under 35 U.S.C. 154(b) by 1156 days.

(21) Appl. No.: 09/716,722

(22) Filed: Nov. 20, 2000

(30) Foreign Application Priority Data

Nov. 22, 1999  (FR) ................................. 99 14647

(51) Int. Cl.
*H04N 5/76* (2006.01)
*H04N 5/167* (2006.01)
*G11B 15/04* (2006.01)
*G11B 19/04* (2006.01)

(52) U.S. Cl. ................... 386/94; 360/60; 380/201; 380/203

(58) Field of Classification Search .............. 386/1, 386/94, 68; 360/60; 380/200–201, 203, 380/210, 212, 216, 217, 223, 228, 239; H04N 5/76, H04N 5/91, 5/92, 9/29
See application file for complete search history.

(56) References Cited

U.S. PATENT DOCUMENTS

| 5,237,611 A | * | 8/1993 | Rasmussen et al. ........ 380/284 |
| 5,289,276 A | * | 2/1994 | Siracusa et al. ............ 348/469 |
| 5,757,909 A | * | 5/1998 | Park ............................ 380/201 |
| 2002/0065969 A1 | * | 5/2002 | Schultz ....................... 710/260 |

FOREIGN PATENT DOCUMENTS

| EP | 0712127 | 5/1996 |
| EP | 0712247 | 5/1996 |
| EP | 0873023 | 10/1998 |

OTHER PUBLICATIONS

Search Report.

* cited by examiner

*Primary Examiner*—Thai Tran
(74) *Attorney, Agent, or Firm*—Joseph J. Laks; Ronald H. Kurdyla; Guy H. Eriksen

(57) ABSTRACT

A process whereby scrambled data of the stream are, in parallel with their recording (6), descrambled (2, 3) so as to extract (4) therefrom additional data corresponding to information required by at least one function of the special mode or "trick mode" (fast forward, fast rewind, accelerated motion, slow motion, etc.). These additional data are also recorded (6) on the recording medium. Applications relate most particularly to recordings on hard disk or DVD.

15 Claims, 2 Drawing Sheets

PROCESS FOR RECORDING A SCRAMBLED MPEG STREAM

FIELD OF THE INVENTION

The invention relates to a process for recording on a recording medium, for example a hard disk, a scrambled audio video digital data stream, for example an MPEG type stream.

BACKGROUND OF THE INVENTION

The storage of data in scrambled form is currently developing rapidly. For example, the audio video digital data transmitted in compressed and scrambled form are generally recorded in this form so as to control access to these data. They are therefore descrambled only when the corresponding images are viewed. Another example relates to the 1394 digital bus, solutions envisaged within the framework of the exploitation of this digital bus being the transmission of digital data in scrambled form and hence their storage in this form.

A problem connected with this recording of digital video data streams in scrambled form relates to the exploitation of particular modes of reading or special modes referred to hereinafter as the "trick mode", using the terminology of the MPEG standard, this term encompassing among other things the following functions: fast forward, fast rewind, slow motion, accelerated motion, freeze frame. These functions actually require access and fast decoding of these recorded data, conditions which are difficult to make compatible with recording in scrambled mode.

SUMMARY OF THE INVENTION

The aim of the invention is to alleviate the aforesaid drawbacks.

Its subject is a process for recording, on a recording medium, a scrambled MPEG stream, characterized in that the scrambled data of the stream are, in parallel with their recording, descrambled so as to extract therefrom additional data corresponding to information required by at least one function of the special mode or "trick mode" (fast forward, fast rewind, accelerated motion, slow motion, etc.) and in that these additional data are also recorded on the recording medium.

The additional data are for example the pointers and the size of images.

The subject of the invention is also a recording medium, characterized in that it contains the data of a scrambled MPEG stream as well as additional data relating to the video data of the stream for the operation of the special mode or "trick mode".

The subject of the invention is also an MPEG audio video digital data stream, characterized in that the video data packets are scrambled with the exception of the packets containing a start of image.

The subject of the invention is also an MPEG audio video digital data stream, characterized in that it includes additional data allowing the extraction of the information required by at least one function of the "trick mode" and in that the said additional data are transported in the adaptation field (to use the MPEG terminology) of the stream.

The subject of the invention is also a process for coding a video data stream, characterized in that it comprises:
 coding of the data according to the MPEG standard so as to deliver a transport stream in the form of data packets, scrambling of the data packets which do not include a start of image, the other packets not being scrambled.

The subject of the invention is also a process for recording on a recording medium, a scrambled MPEG stream, characterized in that the additional data relating to the enciphering keys are, in parallel with the recording of the stream, extracted from the stream so as also to be recorded on the recording medium.

According to one variant, the process is characterized in that the additional data relating to the keys are the pointers of the packets in which the keys are to be found and pointers of packets to which these keys are applied.

According to another variant, the process is characterized in that the additional data relating to the keys are also the deciphered keys.

The subject of the invention is also a recording medium, characterized in that it contains the data of a scrambled MPEG stream as well as additional data relating to the enciphering keys.

By virtue of the invention, the information required by the special modes are directly exploitable without it being necessary to descramble the recorded data in order to retrieve or calculate this information, thus allowing a fast response to the commands of the operator.

The main advantage of the invention is that it allows the use of the trick mode when reading audio video data recorded in scrambled form.

BRIEF DESCRIPTION OF THE DRAWINGS

Other characteristics and advantages of the invention will become apparent on reading the following description, given by way of example and with reference to the figures which represent.

DETAILED DESCRIPTION OF THE PREFERRED EMBODIMENTS

The scrambled audio video data stream is for example the transport stream (TS) as defined in the MPEG standard. The scrambling of the stream or of a packet relates to the useful data (or "payload") and not to the packet headers. This stream is therefore received by the recording device in scrambled form.

Figure 1:
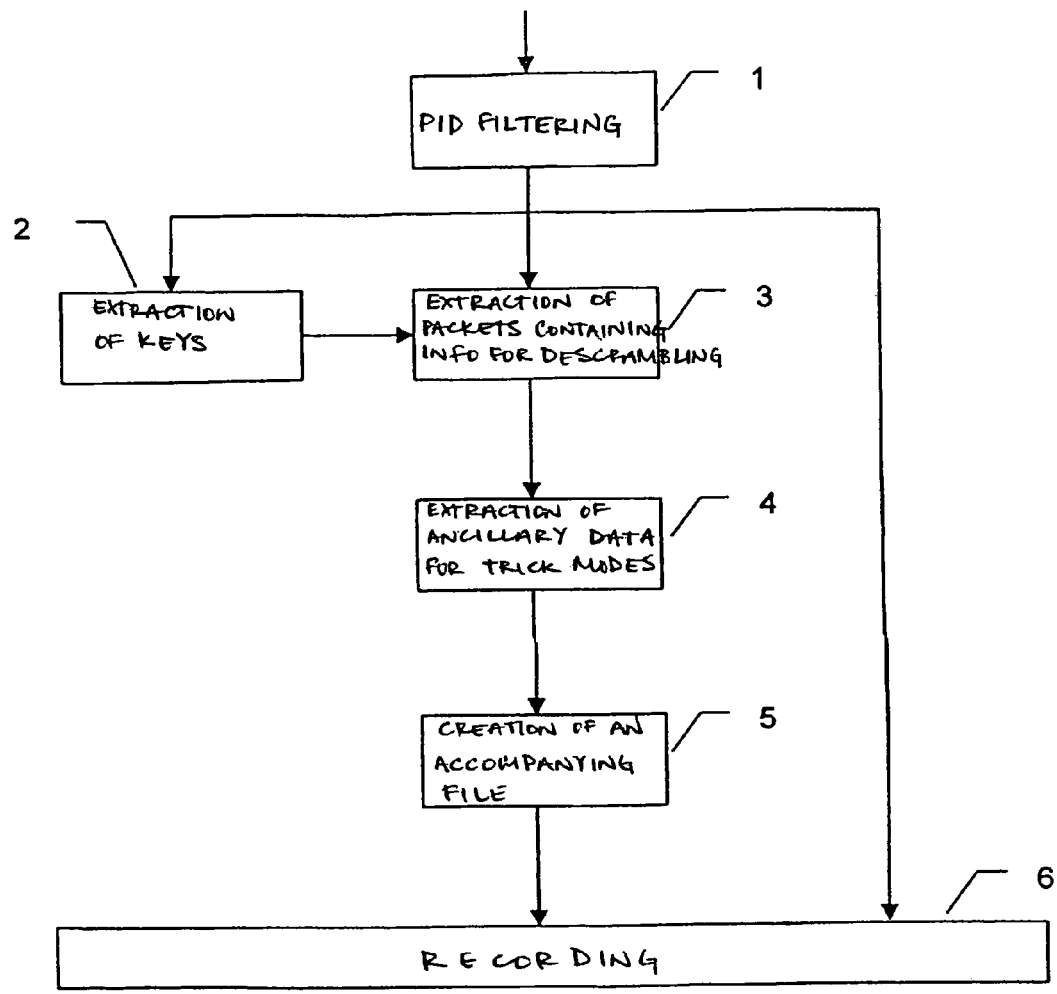
FIG. 1, a flowchart defining the steps of the process for recording additional data, FIG. 2, a flowchart defining the steps of the process for recording data relating to the enciphering keys.

The process implemented by this device is shown schematically by the flowchart of FIG. 1.

A first step 1 consists in filtering the stream received on the basis of the programme choice made, in the case where one wishes to record a single programme. This filtering is performed on the PID (Packet header Identification).

The partial stream obtained, corresponding to the selected programme, is processed in parallel in step 2, step 3 and step 6.

It is thus transmitted directly to a storage unit or recording medium for recording, step 6.

It is also transmitted to a keys extraction circuit for extracting the data (sections) allowing the descrambling of the packets, step 2. This step 2 carries out the extraction, from the scrambled stream, of the keys, possibly encrypted, together in this case with their decryption.

Step 3 extracts, from the partial stream, the packets containing the video information for descrambling by a descrambling circuit. The keys required for this descrambling originate from step 2.

This descrambling obviously requires that the conditional access control system should temporarily allow, during this data recording phase, which must be distinguished from the phase of viewing these video data, descrambling of the stream received, that is to say should require the conditional access information to be available. It is this information which allows the decrypting of the video data, in step 3, on the basis of the keys extracted during step 2 and also, as appropriate, the decrypting of the keys in step 2.

From these descrambled video data are extracted, during the next step 4, the information, referred to as ancillary data or additional data, required for the operation of the "trick mode". This information may, among other things, be the size of the images, the pointers defining the image starts, the image types, etc.

These data are organized so as to construct, during step 5, a file accompanying the audio video file consisting of the recorded scrambled data relating to the partial stream. The next step 6 consists in recording this accompanying file on the medium. It may also involve the construction of a succession of files, the data relating to the "trick mode" then being recorded in tandem with the recording of the scrambled data.

During this step 6, the scrambled data corresponding to the partial stream originating from step 1 are also recorded.

Thus, the data of the audio video file and the data of the accompanying file are stored on the recording medium.

There should be a time correspondence between the ancillary or additional data of the recorded files and the recorded scrambled data. The recorded additional data are for example indexed to the corresponding data of the audio video file.

It is of course also conceivable, without departing from the field of the invention, to record the entire MPEG stream and not just the demultiplexed stream, that is to say the partial stream. It is also possible to choose certain programmes and to record these chosen programmes only. It may also happen that in one and the same programme there are several video streams (PIDs) corresponding for example to several angles of view. The method is then applied, independently, to each of these video streams which are recorded. One can have an accompanying file for each video stream.

Preferably, the descrambling circuits are integrated into the circuits catering for the extraction of the data relating to the trick mode so as to prevent any access to the descrambled audio video stream.

Variants of the invention consist in creating an MPEG stream containing the information relating to the "trick mode" or additional data in unscrambled form and the other data in scrambled form.

For example, solely the packets containing the information useful for the "trick mode" are not scrambled. This information may then be recognized and extracted easily with the aid of a handler, without it being necessary to descramble the stream. This involves for example packets which include an image start and provide the image type, etc. Thus, steps 2 and 3 consisting in extracting the keys and in descrambling so as to obtain the additional data are no longer required, these additional data, such as image start, image type, etc., being obtained from the unscrambled packets of the data stream.

In another example, one or more fields belonging for example to the "Adaptation Field" of a video packet, in the transport stream, and grouping together private data are what are exploited to transport the data useful to the trick mode. Step 4 extracts the "trick mode" information directly from the "Adaptation Field".

Steps 2 and 3 corresponding to the extraction of the keys and to the descrambling of the video data are, here again, no longer useful. It is in fact no longer necessary to descramble the data stream in order to extract the information useful to the trick mode and hence to get access privileges for descrambling, when storing the data on the recording medium.

However, these variants necessitate intervention at the level of the data stream coding chain and hence generate a constraint at the level of the broadcaster, but make it possible to circumvent the access control and security problems related to temporary descrambling.

The use of the "trick mode" requires, in addition to the useful information stored in the accompanying file, information on the keys to be used for each packet in order to be able to carry out the descrambling.

This is because, when accessing any point of an image sequence, the descrambling of the images to be viewed during the trick mode requires the reading, and possibly the deciphering, of the corresponding enciphering key. The keys are available, in the stream, roughly every 100 ms, in a manner which is desynchronized with respect to the images and sufficiently in advance as to be able to perform the descrambling in real time. The deciphered keys must in fact be available when the corresponding scrambled data are read.

Whereas this availability poses no problem in conventional read mode, matters are otherwise when exploiting the "trick mode". This is because, in this case, the data relating to the keys and provided in advance in the stream are not read on account of the ad hoc access to the images useful to the trick mode and are therefore not available in advance.

One solution consists in "putting back" the data stream sufficiently, with respect to the point of access, for example by half a second, so as to be able to extract and decode the enciphering keys before reading the data to be deciphered. The read pointer or read head of the storage medium is positioned a few hundred milliseconds before the point of access to the image which one wishes to decode and whose position one knows by virtue of the pointer extracted from the accompanying file. This solution entails a lag in response and requires that non-useful data be read, possibly giving rise to errors.

The process which is proposed here and which can be exploited independently or in combination with the process described earlier, consists in performing specific operations on the keys so as to ease the descrambling of the data during the "trick mode".

Figure 2:
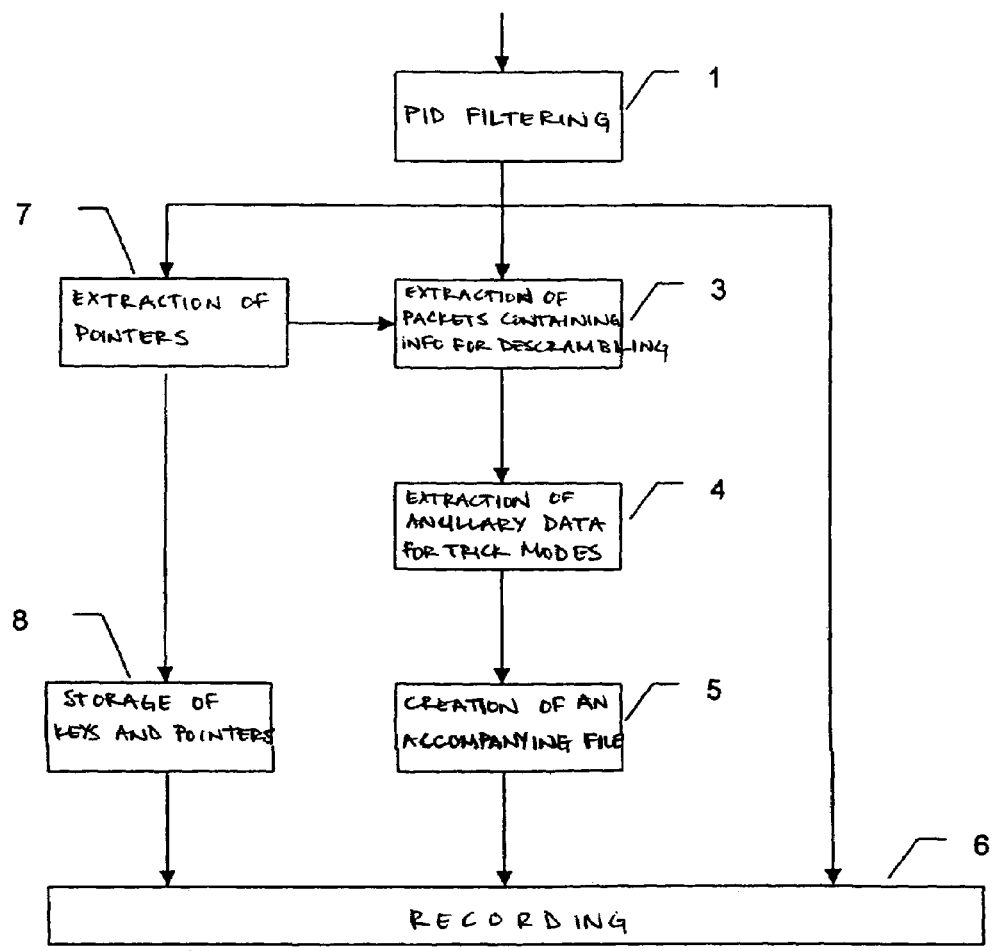

FIG. 2 represents the various steps of the process implemented. Steps 1, 3, 4 and 5 are similar to those described earlier and the same numbering is employed. A new step 7 replaces step 2, performing operations complementary to those of step 2 dependent on the solution adopted, as indicated hereinbelow. This step 7 is followed by a new step 8 which creates one or more files in which the information originating from step 7 is stored. Finally, the data from these files are transmitted to the recording medium so as to be stored there during step 6.

A first solution consists in tagging the position of the packets in the stream containing the encrypted keys, in storing the pointers corresponding to these packets as well as the pointers indicating the portion of the stream to which these keys are applied. Step 7 as a supplement therefore to the extracting of the keys transmitted in step 3 for the descrambling of the video data, extracts the pointers or indices so as to transmit them in step 8 in order to be stored in an accompanying file, the file then being recorded on the recording medium in step 6.

Thus, during the operation of a special mode, the accompanying file provides the position of the packets containing the keys applied to the portion of stream to be read. These packets are read and the keys extracted for the deciphering of the portion of stream to be read.

A second solution consists in transmitting the encrypted keys extracted during step 7, not only in step 3 for the descrambling of the video data but also in step 8 for their storage in an accompanying file. As before, the process also consists, during step 7, in tagging the position of the packets in the stream containing the encrypted keys, in storing the pointers corresponding to these packets as well as the pointers indicating that portion of the stream to which these keys are applied. These pointers or indices are then extracted so as to be transmitted in step 8. This step stores the keys as well as the pointers or indices. The accompanying file comprises, in this case, the enciphering keys and it is then not necessary to fetch them from the recorded stream.

A third solution consists, during this step 7, in addition to the previous operations, in decrypting the keys. These keys are transmitted to the access control device which decrypts them. The decrypted keys as well as the pointers or indices are stored in a file, this file is recorded on the recording medium during step 6, in the form of an accompanying file with a view to the use of its content to descramble the audio and/or video data relating to these keys.

Of course, all these data may be recorded in separate accompanying files.

There should always be a time correspondence between the data of this (these) recorded file(s) and the recorded scrambled data. The recorded data are for example indexed to the corresponding data of the audio video file.

The invention applies to any type of recording medium, for example a hard disk or a DVD (the acronym standing for Digital Versatile Disk).

Variant embodiments are proposed hereinbelow.

Regarding the extracting of the keys which is performed in step 7, a fourth solution consists, during this step 7, in addition to the previous operations, in decrypting the keys and in then re-encrypting them according to another algorithm. These keys are transmitted to the access control device which decrypts them. The decrypted keys are then transmitted to another enciphering device. The re-encrypted keys as well as the pointers or indices are stored in a file, this file is recorded on the recording medium during step 6, in the form of an accompanying file with a view to the use of its content to descramble the audio and/or video data relating to these keys.

Regarding the pointers recorded in step 8, indicating that portion of the stream to which the keys are applied, a precise value of these pointers, that is to say which corresponds to the stream portion relevant to the key, is not necessary.

In general the encrypted keys are sent in pairs, applying to two contiguous portions of stream; moreover, the two decrypted keys are available to the demultiplexer at any time, so as to ensure correct transition between the two portions of stream. One way of indexing the stream is therefore to store the keys in pairs and to associate therewith a pair of pointers corresponding to the start and to the end of a stream segment to which each of the two keys is applied in succession. These pointers may for example be generated when the pairs of decrypted keys are received from the access control system (the "smart card" or chip card).

It may in fact be noted that the start of a stream portion to which a key is applied is characterized, in an MPEG stream, by a change of value of the "transport_scrambling_control" field in the header of a packet. It is the detecting of this change which will decide on the application of the new key from the pair of keys. It is therefore sufficient to link a pair of keys to a pointer designating a packet in respect of which the first key is applied, and to store this pointer given that, in the stream, the next change of this field, in the header, will indicate that the new key must be applied. This pointer can be that corresponding to the instant of descrambling of a new pair of keys.

It will be noted that the stream portion to which a key is applied does not necessarily comprise all the packets included between the pointers; the packets relating to a key are identified by the PIDs.

Of course, the process which consists in storing, on a recording medium, data of the scrambled MPEG stream and data of an ancillary file which includes data specific to the operation of the trick mode so as to exploit the data of the MPEG stream relates equally well to the writing of data to a medium as to the reading of these data.

The invention also relates to the process for decoding a scrambled MPEG stream recorded on a recording medium, including the reading, from the recording medium, of scrambled data of the MPEG stream and of additional data other than these scrambled data and relating to the enciphering keys used for the scrambling, and the descrambling of the MPEG stream data read on the basis of these additional data read.

It also relates to the process for implementing the special mode or "trick mode" function (fast forward, fast rewind, accelerated motion, slow motion, etc.) on the basis of the reading of data stored on a recording medium which consists in reading additional data from the recording medium which includes information required by the special mode and in then reading the data of the medium as a function of these additional data. These data are, for example, pointers to the start of images and to the types of images.

These two processes can be combined if the data stored are scrambled data. One example is scrambling according to the MPEG standard, which is carried out at the level of the data packets, the pointers then not being modified by the scrambling.

What is claimed is:

1. A process for recording, on a recording medium, a scrambled digital video stream, implementing the following steps, in addition to the recording of the scrambled data:
   descrambling of said scrambled data of said stream so as to extract therefrom additional data corresponding to information required by at least one function of the special mode or "trick mode" (fast forward, fast rewind, accelerated motion, slow motion, etc.); and
   recording of these additional data on the recording medium.

2. A process according to claim 1, wherein said additional data are the pointers and the size of images.

3. A process according to claim 1, wherein said digital video stream is an MPEG stream obtained by filtering the TS (Transport Stream) headers of a multiprogramme MPEG stream, as a function of the selected programme or programmes to be recorded.

4. A process according to claim 1, wherein said recording medium is a hard disk or a recordable DVD.

5. A process for recording on a recording medium, a scrambled digital video stream, comprising a step for descrambling the stream in such a way as to extract additional data relating to the keys for enciphering this scrambled stream and a step for recording these data on the recording medium.

6. A process according to claim 5, wherein the additional data relating to the keys are the pointers of the packets in which the keys are to be found and pointers of packets to which these keys are applied.

7. A process according to claim 6, wherein the pointers of packets to which these keys are applied are the pointers defining the stream portions to which the keys are applied.

8. A process according to claim 7, wherein the pointers to the stream portions to which the keys are applied are obtained from the information concerning a change of value of the "transport_scrambling_control" field of the scrambled MPEG stream.

9. A process according to claim 6, wherein the pointers of packets to which these keys are applied are pointers defining a stream segment to which each of the two keys of a pair of keys is applied in succession.

10. A process according to claim 5, wherein the enciphered keys are extracted from the stream so as to be recorded with the additional data relating to the keys.

11. A process according to claim 5, wherein the additional data relating to the keys are the deciphered keys.

12. A process according to claim 6, wherein the additional data relating to the keys are also the deciphered keys then reciphered with another enciphering device.

13. A process according to claim 5, wherein the recording medium is a hard disk or a recordable DVD.

14. A process for decoding a scrambled MPEG stream recorded on a recording medium, for implementing a special mode ("trick mode"), comprising the following steps:

reading, from the recording medium, of scrambled data of the MPEG stream, reading, from the recording medium, of additional data other than the scrambled data of the MPEG stream, having a time correspondence with the scrambled data and corresponding to information relating to the enciphering keys used for the scrambling, descrambling of the MPEG stream data read as a function of the additional data read.

15. A process for decoding a scrambled MPEG stream recorded on a recording medium, for implementing a special mode ("trick mode"), comprising the following steps:

reading, from the recording medium, of additional data, other than the scrambled data of the MPEG stream, corresponding to information required by at least one function of the special mode or "trick mode" (fast forward, fast rewind, accelerated motion, slow motion, etc.), reading, from the recording medium, of scrambled data of the MPEG stream which are determined as a function of the said additional data.

* * * * *